No. 748,483. PATENTED DEC. 29, 1903.
A. M. CROWL.
STEAM ENGINE LUBRICATOR FILLER.
APPLICATION FILED APR. 12, 1900.
NO MODEL.
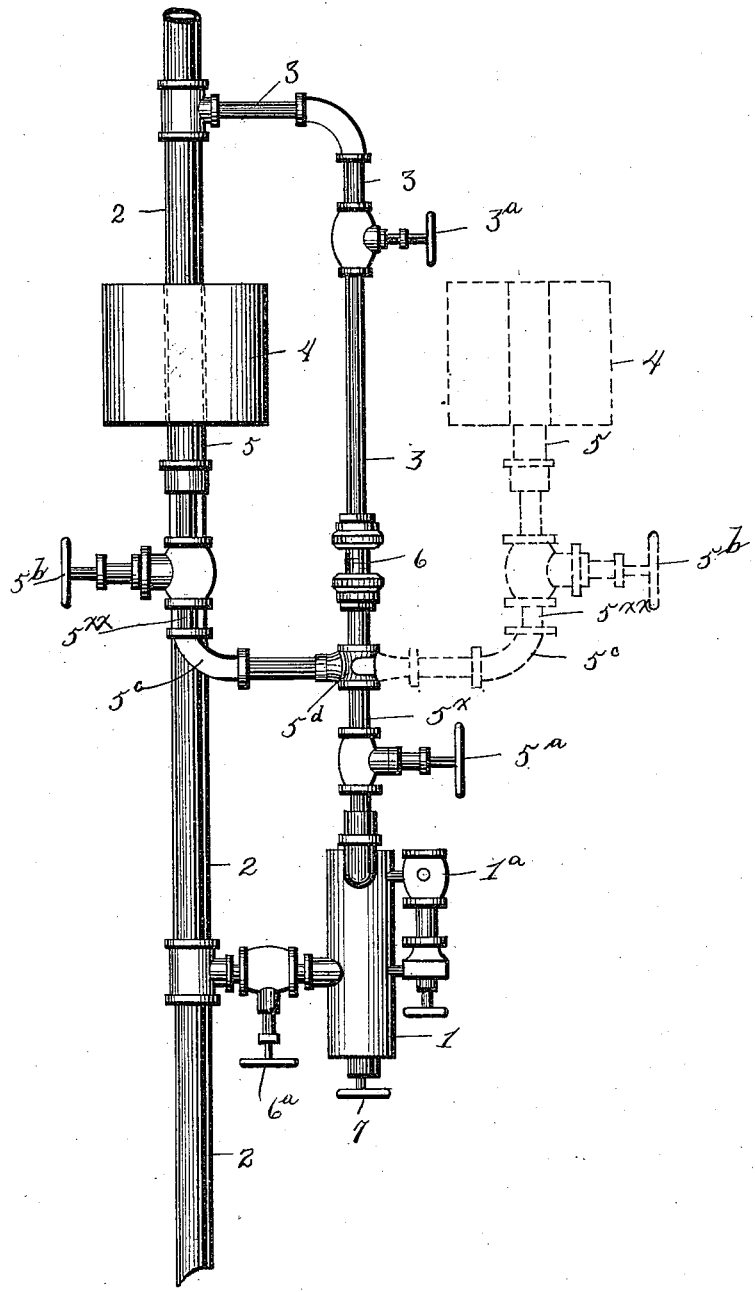
Witnesses
Inventor
Andrew M. Crowl.
By Edson Bros
Attorneys No. 748,483.

Patented December 29, 1903.

UNITED STATES PATENT OFFICE.

ANDREW M. CROWL, OF SEBRING, OHIO, ASSIGNOR TO ELMER A. WILSON, OF NILES, OHIO.

STEAM-ENGINE-LUBRICATOR FILLER.

SPECIFICATION forming part of Letters Patent No. 748,483, dated December 29, 1903.

Application filed April 12, 1900. Serial No. 12,658. (No model.)

*To all whom it may concern:*

Be it known that I, ANDREW M. CROWL, a citizen of the United States, residing at Sebring, in the county of Mahoning, in the State of Ohio, have invented a new and useful Steam-Engine-Lubricator Filler, of which the following is a specification.

My invention relates to certain improvements in lubricators of the sight-feed class, more especially means for filling the same with the lubricant. It has for its object to provide for the maintenance of the oil or lubricant in a limpid or fluent condition, especially as necessary in using thick oils in cold weather to facilitate or expedite the proper filling of the lubricator therewith; also, to provide for the ready replenishing of the lubricant or oil when filling the lubricator in the manner heretofore practiced.

The nature of the invention consists of the combination of parts, including their construction and arrangement, substantially as hereinafter more fully disclosed, and specifically pointed out by the claims.

In the accompanying drawing, illustrating the preferred embodiment of my invention, the figure is a side elevation showing the oil-filling tank in contact with the steam or heating pipe.

In carrying out my invention I employ a suitable lubricator proper, 1, having an ordinary water of condensation and oil indicator $1^a$, to which lubricator is suitably connected a steam-pipe 2, leading from a steam-boiler (not shown) to provide for delivering or feeding the lubricant or oil to the part to be lubricated through an additional pipe connection 3, equipped with a valve $3^a$ to regulate or wholly cut off the feeding or flow of the oil or lubricant therethrough.

A suitable reservoir or tank 4, holding oil or lubricant for feeding or filling into the lubricator 1, has pipe connection 5 with said lubricator for that purpose, said pipe connection being equipped with valves $5^a$ $5^b$. The pipe connection 5 comprises two sections $5^\times$ $5^{\times\times}$, connected together and one connecting with the bottom of said tank and the other connecting laterally with said lubricator. The pipe-section $5^\times$ has a feed glass tube or indicator 6 attached to its upper end and adapted to communicate therewith. The pipe-section $5^{\times\times}$ has a lower end elbow portion $5^c$ connected to a T or union $5^d$, having a steam and oil tight joint or connection with and adapted to turn upon the pipe-section $5^\times$ at its upper end, whereby the pipe-section $5^{\times\times}$, together with the lubricant-filling tank, is rendered capable of being swung or moved horizontally to permit of disposing said tank in contact with the steam-pipe for heating its contained lubricant or for removing said tank from said steam-pipe, as when the consistency of the lubricant may be such that the lubricant does not need heating to cause it to readily flow, as in warm weather, or for greater convenience in replenishing the supply of lubricant. This provides for maintaining the oil or lubricant always limpid, especially as necessary in using thick oils in cold weather to facilitate or expedite the flow of the lubricant from said tank through its delivery or discharge pipe to the lubricator, as in filling said lubricator. Preliminary to filling the lubricator the steam is wholly cut off by properly closing the valve $3^a$, also a valve in an arm or pipe, as at $6^a$, between the steam-pipe 2 and lubricator 1. The drip cock or valve 7 is opened, running off the steam and water of condensation from the lubricator, after which said drip cock or valve is closed. The valve $5^a$ is next opened, allowing any oil or lubricant in the pipe-section $5^\times$, also in glass tube 6, to run down into the lubricator. The valve $5^b$ is now opened, permitting the oil in the oil tank or reservoir 4 to flow through the pipe 5, but not to pass into the glass tube or indicator 6, it taking the route of least resistance, and to finally enter the lubricator. In filling the lubricator the oil or lubricant flowing from the tank 4 will back up into the pipe-section $5^\times$ and rise into the glass tube or indicator as the route or path of least resistance, thus indicating that the lubricator, together with the piping, is filled. At this juncture the valve $5^b$ is closed, cutting off pressure from above, after which the valve $5^a$ is closed, when by opening the steam-pipe valves and partially opening valve $5^a$ the action of the steam thus turned on will effect the feeding or delivery of the lubricant through the pipe 3 and the pipe 2 to the part to be lubricated.

Having thus fully described my invention, what I claim as new, and desire to secure by Letters Patent, is—

1. The combination, with a lubricator of the character described, of a lubricant-filling device comprising a tank or receptacle having pipe connection therewith and means adapted to permit said tank to be swung toward or away from the steam-pipe for delivering or passing the lubricant from said lubricator, substantially as set forth.

2. The combination, with a lubricator of the character described, of a lubricant-filling device comprising a tank or receptacle having a sectional pipe connection with the lubricator, one pipe-section pivoting or turning in the other pipe-section, to provide for the movement of said tank or receptacle toward or away from the steam-pipe delivering the lubricant from the lubricator, substantially as set forth.

3. The combination, with a lubricator of the character described, of a lubricant-filling device comprising a tank or receptacle, valved pipe-sections, one pivoted to the other and connecting together said tank and lubricator, a steam-pipe having valved connections with said lubricator and also having a second valved arm or branch, and a sight-feed tube connected to the upper end of the valved pipe-section that is connected directly to the lubricator and to the lower end of said second valved arm or branch of said steam-pipe.

ANDREW M. CROWL.

In presence of—
WM. M. ROACH,
MAGGIE DAVIS.